United States Patent [19]
Van Sandt

[11] Patent Number: 5,212,907
[45] Date of Patent: May 25, 1993

[54] DOOR INCLUDING ELECTRICAL DEVICE AND PIVOTABLE CONDUCTOR THEREFOR

[76] Inventor: Ed Van Sandt, 1422 41st St. West, Birmingham, Ala. 35208

[21] Appl. No.: 959,805

[22] Filed: Oct. 13, 1992

[51] Int. Cl.⁵ .................................... E06B 7/00
[52] U.S. Cl. ............................ 49/70; 49/167; 49/381; 174/86; 439/31
[58] Field of Search .............. 49/381, 167, 70; 174/86; 439/31

[56] References Cited

U.S. PATENT DOCUMENTS

| | | |
|---|---|---|
| 221,434 | 11/1879 | Watson . |
| 463,420 | 11/1891 | Gartland . |
| 531,515 | 12/1894 | Davis . |
| 597,228 | 1/1898 | Walker ........................ 439/31 X |
| 615,209 | 11/1898 | Baxter . |
| 1,744,040 | 1/1930 | Elzer ........................... 174/86 UX |
| 2,259,800 | 10/1941 | Cox ............................. 173/324 |
| 2,305,100 | 12/1942 | O'Brien . |
| 2,305,101 | 12/1942 | O'Brien . |
| 2,477,901 | 8/1949 | Robboy ....................... 174/86 |
| 2,493,125 | 1/1950 | Foster .......................... 49/70 X |
| 2,778,000 | 1/1957 | Mills ............................ 339/4 |
| 2,945,084 | 7/1960 | Daggett ....................... 174/86 |
| 3,355,695 | 11/1967 | Overesch ..................... 49/70 X |
| 4,445,299 | 5/1984 | Lehikoinen et al. ........ 49/167 |
| 4,657,320 | 4/1987 | Bamford et al. ............ 339/4 |

Primary Examiner—Philip C. Kannan
Attorney, Agent, or Firm—Nies, Kurz, Bergert & Tamburro

[57] ABSTRACT

A door that includes one or more electrical devices, such as an outlet receptacle, an illuminated house number sign, or an illuminated display panel. The electrical devices are powered from an external source of power that is conducted through a pair of pivotable conductors extending between the door and the adjacent door frame. One end of the pivotable conductors is electrically connected with a source of electrical power, and the other end of the respective pivotable conductors is electrically connected with the electrical devices carried by the door, to avoid external extension cords and to avoid the need to conduct electricity through the door hinges.

17 Claims, 3 Drawing Sheets

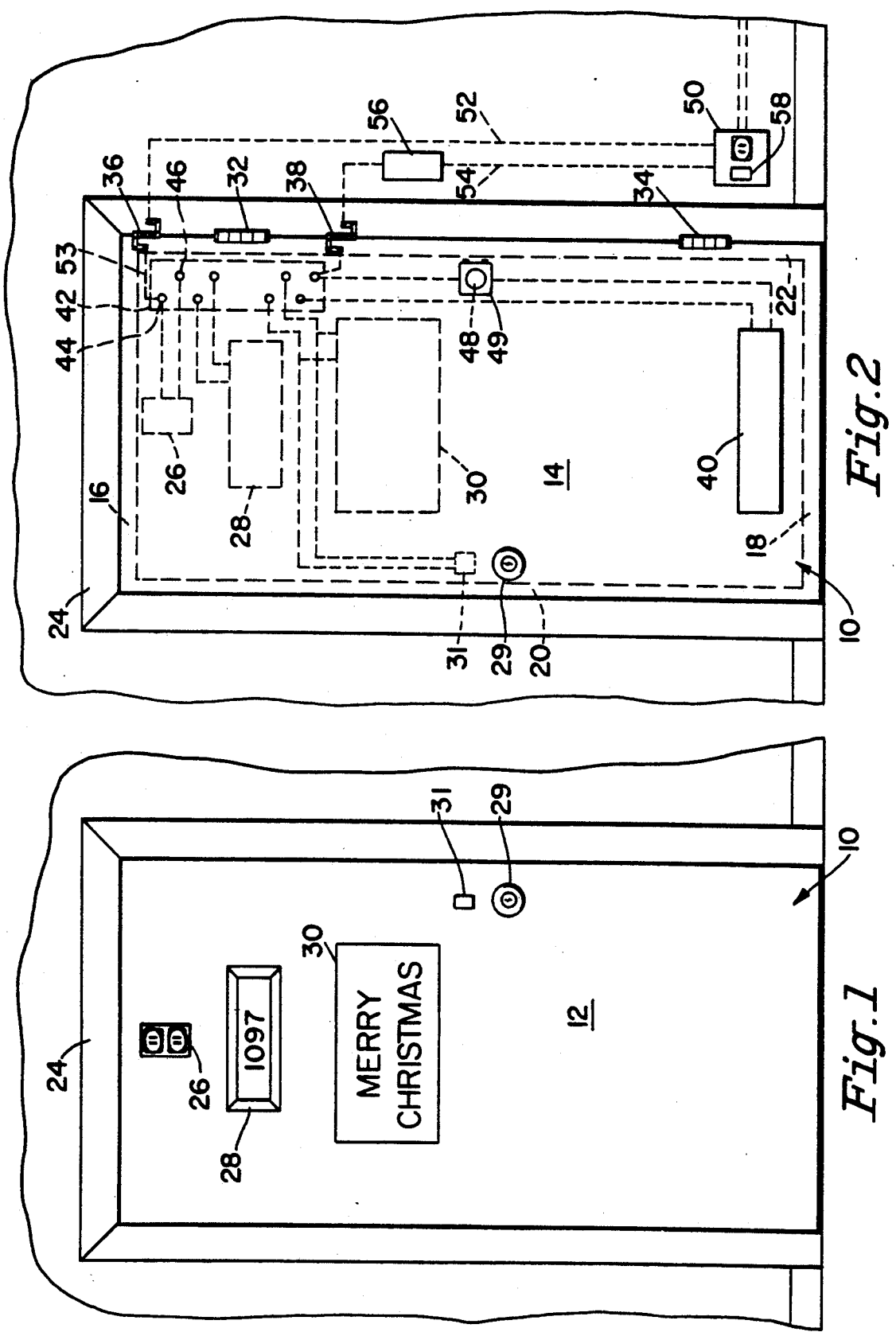

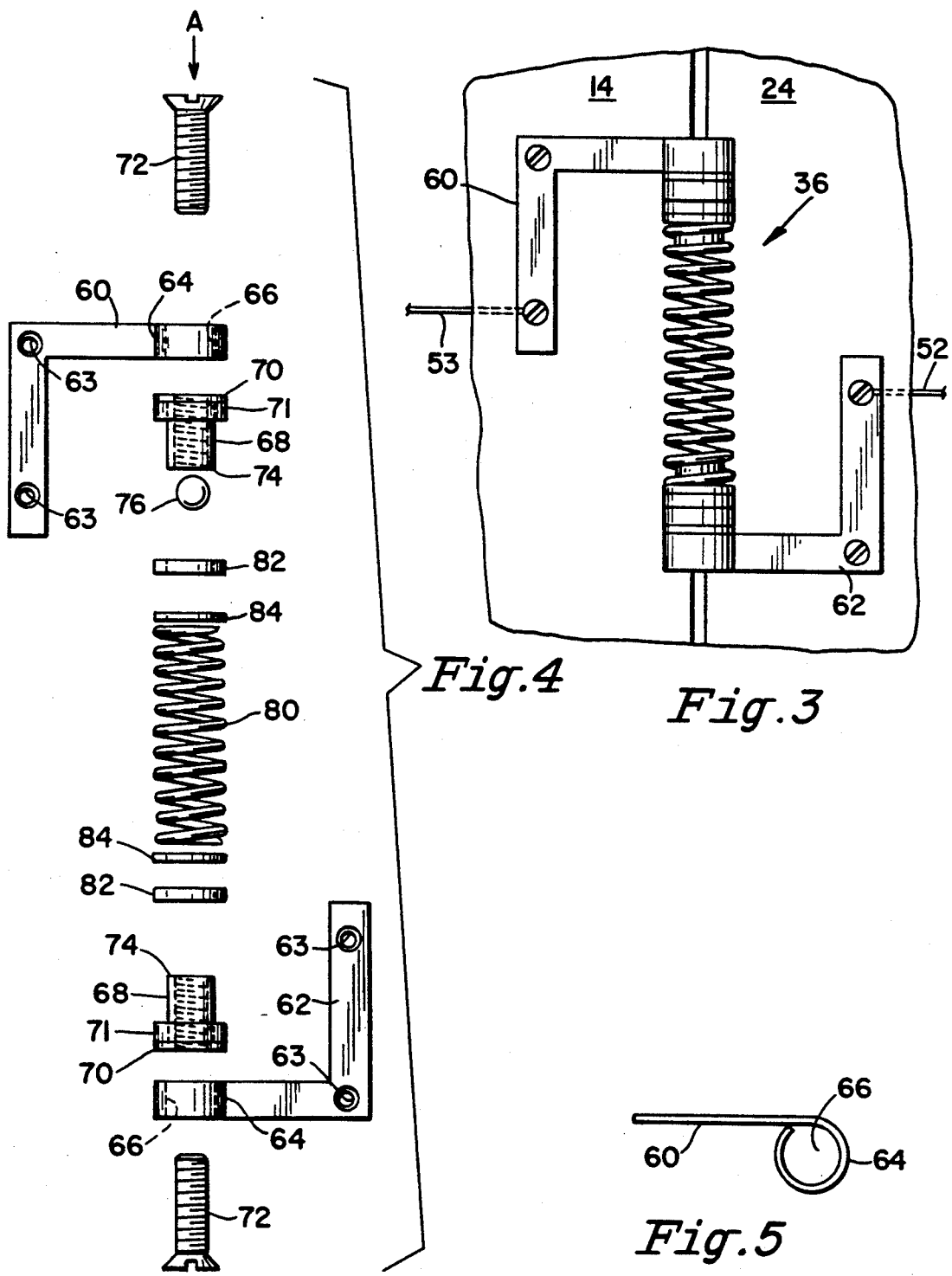

DOOR INCLUDING ELECTRICAL DEVICE AND PIVOTABLE CONDUCTOR THEREFOR

BACKGROUND OF THE INVENTION

1. FIELD OF THE INVENTION

The present invention relates to doors, and more particularly to a door that includes an electrical device, such as an electrical outlet, a light fixture, or the like. Additionally, the invention also relates to a pivotable electrical conductor that can be positioned between a door and door frame to permit the uninterrupted transfer of electrical power from a power source external to the door to the electrical device carried by the door.

2. DESCRIPTION OF THE ART

Oftentimes, signs, displays, or other electrically-operated devices are desired to be attached to a door, either permanently or temporarily. For example, during the Christmas season house doors are frequently decorated with lights of various types, which can include lighted wreaths, signs bearing holiday greetings, or the like. Because house doors customarily do not carry electrical outlets, and because the source of power for such lights or displays is separate from the door, extension cords connected with and extending from an interior or an exterior outlet are normally used. However, such use of extension cords is unsightly and could at times be dangerous in that guests visiting the home might trip and fall over the extension cords.

The notion of conducting electrical power through a door hinge is well known. For example, the following patents disclose hinged members, including doors, wherein electricity is conducted through the hinge structure itself: U.S. Pat. No. 221,434, issued Nov. 11, 1879, to T. A. Watson; U.S. Pat. No. 531,515, issued Dec. 25, 1894, to A. B. Davis; U.S. Pat. No. 615,209, issued Nov. 29, 1898, to C. Baxter; U.S. Pat. No. 1,744,040, issued Jan. 21, 1930, to J. Elzer; and U.S. Pat. No. 2,778,000, issued Jan. 15, 1957, to J. R. Mills.

In addition to the door hinge patents identified immediately above, the following patents disclose pivotable couplings for electrical wiring systems: U.S. Pat. No. 463,420, issued Nov. 17, 1891, to F. X. Gartland; U.S. Pat. No. 597,228, issued January 11, 1898, to H. H. and F. D. Walker; U.S. Pat. No. 2,305,100, issued Dec. 15, 1942, to J. F. O'Brien; U.S. Pat. No. 2,305,101, issued Dec. 15, 1942, to J. F. O'Brien; U.S. Pat. No. 2,259,800, issued Oct. 21, 1941, to B. Cox; and U.S. Pat. No. 4,657,320, issued Apr. 14, 1987, to W. C. Bamford et al.

Although the conduction of electrical power between a door frame and a door or other pivotable element is known, the prior art arrangements contemplate the transfer of the power directly through a hinge, which is undesirable because a hinge is a weight-bearing member, and it is preferable to conduct the power through a non-weight-bearing member. Additionally, hinges are frequently oiled, which could at times affect the conduction path and thereby interfere with the normal operation of an electrical device that receives power through the hinge.

It is an object of the present invention to overcome the shortcomings of the prior art devices.

SUMMARY OF THE INVENTION

Briefly stated, in accordance with one aspect of the present invention, a door is provided that is pivotally carried by a door frame and includes an electrical device o circuit that is carried by the door and that is adapted to be electrically connected with a source of electrical power that is external to the door. The door includes a structure having an outer surface and an inner surface, the outer and inner surfaces spaced from each other to define an interior space. The door structure includes top, bottom, and side panels that extend along and between edges of the outer and inner surfaces to inclose the interior space. An electrical device or circuit is carried by the door within the interior space and extends through one of the outer and inner surfaces to permit an electrical device to be carried by the inner or outer surfaces. A pair of pivotable electrical conductors is provided, the electrical conductors being electrically coupled with the circuit carried by the door and positioned on the door adjacent a side panel thereof. The pivotable conductors are spaced from each other and are spaced from and separate from hinges that support the door from the door frame. The pivotable conductors include a door-mounted and a frame-mounted member, and an intermediate member extending between and conductively coupled with the door-mounted member and the frame-mounted member to conduct electrical power from a source external to the door to the circuit carried by the door.

DESCRIPTION OF THE DRAWINGS

FIG. 1 is a front elevational view of a front door of a home, showing several electrically-operated devices that are carried by the door on the outer surface thereof.

FIG. 2 is a rear elevational view of the door shown in FIG. 1, illustrating the interior surface of the door and showing the electrical connections with the source of house power for electrical devices that are carried by the door.

FIG. 3 is an enlarged, fragmentary view of a pivotable electrical conductor in accordance with the present invention.

FIG. 4 is an exploded view of the pivotable electrical conductor shown in FIG. 3.

FIG. 5 is a top view of an end of one part of the conductor shown in FIG. 4, and viewed in the direction of arrow A of FIG. 4.

DESCRIPTION OF THE PREFERRED EMBODIMENTS

Figure 6:
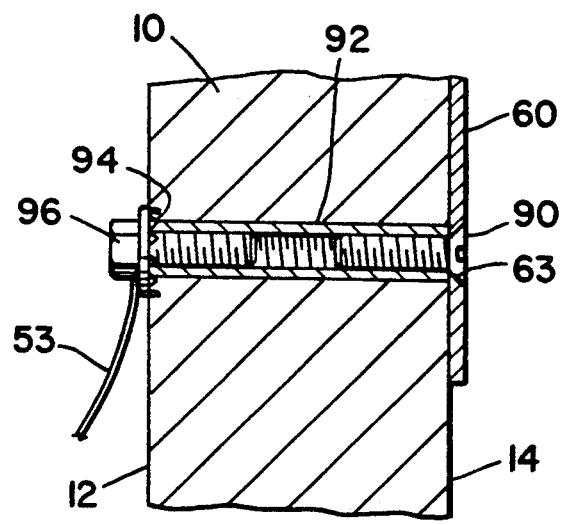
FIG. 6 is an enlarged, fragmentary, cross-sectional view through a portion of the door inner surface, showing the electrical connection path from the conductor to the interior of the door.

Referring now to the drawings, and particularly to FIGS. 1 and 2 thereof, there is shown a door 10, which can be the front door to a home. Door 10 is of generally rectangular configuration and has an outer surface 12 and an inner surface 14. The outer and inner surfaces of door 10 are spaced from each other to define a hollow interior volume therebetween, which can be filled with thermal insulation, if desired, to minimize heat transfer through the door and to thereby conserve energy. As seen in FIG. 2, top end member 16, bottom end member 18, and side end members 20 and 22 are positioned along the peripheral edges of each of the inner and outer surfaces of door 10 to space them from each other and also to enclose the interior volume within the door.

As seen in each of FIGS. 1 and 2, door 10 is positioned within a corresponding rectangular door frame 24. An electrical outlet 26 that contains two electrical plug receptacles is carried by door 10, and is substantially flush with outer surface 12 thereof. Additionally, door 10 also carries on outer surface 12 at a point below outlet 26 a house number sign 28, which as shown is a rectangular plate, preferably of translucent glass or translucent plastic and having a house number applied to one surface of the plate. Positioned behind house number sign 28 is a suitable light fixture (not shown), preferably containing several small wattage light bulbs for providing illumination of house number sign 28 so that the number is readily visible at nighttime.

Also shown positioned below outlet 26 and house sign 28 on outer surface 12 of door 10 is a display sign 30, which as shown could be a Christmas greeting, or the like. Display sign 30 can be hung on the outer surface of the door, if only a temporary display is intended, or it can also be a translucent glass or translucent plastic panel, suitably decorated, with a light fixture (not shown) containing several low wattage light bulbs positioned behind th display panel and within the interior volume of the door to provide illumination of the display sign. In that structural arrangement the display can be changed seasonally, if desired, or various other designs or messages can be provided on the display sign, such as a welcome sign.

In addition to carrying any of a variety of display signs, which can provide seasonal greetings or seasonal designs, the space occupied by display sign 30 on door 10 can, instead, be provided with a translucent panel bearing a likeness of a person or of an animal, or of an ornamental design, in the form of an etching or a painting.

A further convenience provided on outer surface 12 of door 10 is a small night light 31 positioned above door knob 29 and oriented to direct light downwardly onto door knob 29 at night.

Referring now to FIG. 2, door 10 is hingedly supported by door frame 24 on a pair of hinges 32, 34 that are attached to each of door 10 and door frame 24 in a conventional manner. Spaced from each of hinges 32, 34, and spaced from each other, are a pair of pivotable electrical conductors 36, 38, the structure of which will be hereinafter described in greater detail. Conductors 36, 38 permit the conveyance of electrical power from a power source external to door 10, through the respective conductors, to the interior volume of door 10 for distribution to the several electrical devices or circuits that are carried within the door. In that regard, interior surface 14 of door 10 can include a night light 40, which is shown positioned at the lower portion of door 10 to direct light in a downward direction toward the floor.

The electrical distribution arrangement within door 10 is shown in phantom in FIG. 2, and includes a terminal block 42, one set of vertically extending and interconnected terminals 44 of which is connected with pivotable conductor 36 and the other set of vertically extending and interconnected terminals 46 is connected with pivotable conductor 38. As shown in FIG. 2 by dashed lines, wire conductors can be provided within door 10 to extend from the terminals 44, 46 of terminal block 42 to each of the several circuits or devices carried by the door, such as electrical outlet 26, house number sign 28, and display sign 30 that are carried on outer surface 12 of door 10. Additionally, night light 40 can also be connected by suitable wire conductors to terminal block 40. As shown, one of the wire conductors extending from night light 40 can also include an adjustable dimmer switch 48, which has a rotatable knob to operate a rheostat (not shown), or the like, to vary the intensity of the lighting provided by night light 40. Preferably, the body of dimmer switch 48 is recessed within the interior of door 10 and a pivotable cover 49 is provided to conceal switch 48 from view, yet permit convenient access to the switch to vary the intensity of the light emanating from night light 40.

The power distribution arrangement within door 10 is connected to a source of power (not shown) through a wall outlet 50. A pair of wire conductors 52, 54 extend from wall outlet 50 to respective pivotable conductors 36 and 38 on the door frame side thereof. A single pole on-off switch 56 can be connected in wire conductor 54 to selectively connect or disconnect the electrical devices carried by door 10 from the source of electrical power. Alternatively, if desired, a timer-operated switch (not shown) can be provided to automatically provide power to the door-carried electrical devices at selected times of the day.

Another alternative is the provision of a remotely operated switch 58, which can be operated by a remote control (not shown), such as an infra-red transmitter of conventional type, to emit an infra-red signal that is received by a sensor connected with switch 58 in wall outlet 50 to which the door-carried electrical devices are electrically connected. With a remote control one can manually turn on or off the door-carried devices when desired, and without the need to go to the door to do so.

The structure of each of pivotable electrical conductors 36 and 38 that carry electrical power from the power source on the door frame side of door 10 to door 10 itself, and to the door-carried electrical devices, is shown in assembled form in FIG. 3 and is shown in an exploded view in FIG. 4. Conductor 36 includes a pair of spaced connector members 60, 62 that are shown in generally L-shaped form, although other forms can also be utilized. Connecting members 60 and 62 each have a pair of spaced openings 63 to permit the respective connecting members to be attached by screws to interior surface 14 of door 10 and to the adjacent surface of door frame 24, in spaced relationship as shown in FIG. 3. Each of connecting members 60 and 62 is a generally flat, elongated member, and one end of each connecting member is bent to form a loop 64, as best seen in FIG. 5, to provide a circular opening 66. The respective connecting members are disposed relative to each other so that the centers of the respective circular openings 66 are coaxial with each other.

As best seen in FIG. 4, a pair of internally threaded tubular sleeves 68 each having an outwardly extending flange 70 or lip at one end are positioned against an end of respective connecting loops 64 and are secured to a respective one of connecting members 60, 62 by suitable connecting bolts 72 that are threadedly engaged with the internal threads in sleeves 68. The length of each of connecting bolts 72 is less than the length of sleeves 68 to provide a space between the inner ends of the connecting bolts and the ends 74 of the sleeves 68 when the sleeves are attached to the respective connecting members 60 and 62. A skirt 71 that depends downwardly from the outer periphery of flange 70 defines an annular space for receiving and retaining an end of a spring, as will be hereinafter described.

Positioned between ends 74 of the two sleeves 68 is a steel ball 76 that extends partially into the interior of each of the sleeves to provide a uninterrupted electrical conduction pathway between the two sleeves when the conductor is assembled. If desired, the outwardly facing surfaces of ends 74 of the respective tubular sleeves 68 can be formed without the spherical recesses.

Each of the connecting members 60 and 62, the tubular sleeves 68, and the ball 76 are formed from electrically conductive materials so that when the pivotable conductor is assembled, as shown in FIG. 3, there is direct electrical connection between the respective connecting members 60 and 62.

A second conduction path between the respective connecting members 60 and 62 is provided in the form of a helical compression spring 80, which is of such a size as to extend between the flanges 70 of the respective tubular sleeves 68, and to be in intimate contact with the outer surfaces thereof. Spring 80 is received in the annular spaces defined by depending skirts 71, which cover the ends of spring 80. The positioning of spring 8 between and in contact with each of sleeves 68 ensures a continuous, uninterrupted alternative electrical connection between connecting members 60 and 62, even if wear between ball 76 and ends 74 of tubular sleeves 68 results in absence of firm contact therebetween and consequent interruption of a firm electrical contact path. Because there is relative rotation between the spring and flanges 70 of the respective tubular sleeves 68 when the conductor is assembled and in use, preferably a washer-shaped bearing 82 is provided at each axial end of spring 80 to maintain electrical contact between spring 80 and flanges 70 of tubular sleeves 68, but at the same time to reduce the friction therebetween when door 10 is opened and closed. Suitable bearings for that purpose are available from Winfred M. Berg, Inc., of East Rockaway, New York, such as Berg Model B5-3 bearings. Additionally, a flat washer 84 is preferably positioned between a end of spring 80 and a respective bearing 84, which washer can be an oil-impregnated type, if desired. In any event, washers 84, bearings 82, and spring 80 are each made from electrically conductive materials to provide an uninterrupted conduction path between the respective connecting members 60 and 62.

The electrical connection between connecting member 60 of conductor 36 and the interior of the door, to provide electrical power to terminal block 42 is shown in FIG. 6. Connecting member 60 is attached to door inner surface 14 by a pair of flat head screws 90 (only one of which is shown) that are received in countersunk holes 63 formed in connecting member 60. An internally threaded, electrically conductive tubular sleeve 92 extends through the door surface panel from inner surface 14 inwardly and terminates on the inside surface of the door panel at a cleated end 94. The cleats are provided to securely hold sleeve 92 in the door panel and to prevent its rotation relative to the door panel. A bolt 96 is threadedly received within the inner end of sleeve 92 and carries conductor 53, in the form of a wire, which is also connected with terminal block 42 (see FIG. 2).

Figure 7:
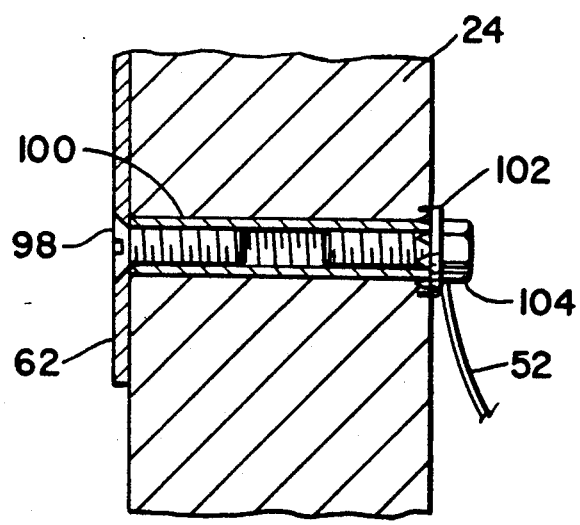
FIG. 7 is an enlarged, fragmentary, cross-sectional view similar to that of FIG. 6, taken through a portion of the door frame and showing the electrical connection path from the conductor to the source of house power.

The electrical connection between the source of house power and connecting member 62 of conductor 36 through door frame 24 is similar to the connection in door 10 as described above an is shown in FIG. 7. Connecting member 62 is attached to frame 24 by a pair of flat head screws 98 (only one of which is shown) that are received in countersunk holes 63 formed in connecting member 62. An internally threaded, electrically conductive tubular sleeve 100 extends inwardly through door frame and terminates on the inside surface of the frame at a cleated end 102. The cleats are provided to securely hold sleeve 100 in the door frame and to prevent its rotation relative to the door frame. A bolt 104 is threadedly received within the inner end of sleeve 100 and carries conductor 52, in the form of a wire, which is also connected with the source of house power through wall outlet 50 (see FIG. 2).

Although one form of electrical connection between the source of house power and conductor 36 and between terminal block 42 in door 10 and conductor 36 has been shown and described, that illustration and description are merely illustrative of how the electrical connections can be made. In any actual construction and use of the present invention the connections must be in accordance with local electrical codes. Accordingly, some differences in installation details may exist between the installation shown herein and one that conforms with local electrical code requirements.

It can thus be seen that the present invention provides distinct advantages over the prior art devices in that a non-weight-bearing pivotable conductor is provided that permits continuous, uninterrupted conduction of electricity from a source of electricity external to a door to a point within the door to permit electrical devices carried by the door to be operated.

Although particular embodiments of the present invention have been illustrated and described, it will be apparent to those skilled in the art that various changes and modifications can be made without departing from the spirit of the present invention. Accordingly, it is intended to encompass with the appended claims all such changes and modifications that fall within the scope of the present invention.

What is claimed is:

1. A door pivotally carried by a door frame and including an electrical circuit carried by the door and adapted to be electrically connected with a source of electrical power that is external to the door, said door comprising:
   a. a door structure having outer and inner surfaces, the outer and inner surfaces spaced from each other to define an interior space, the door structure including top, bottom, and side panels extending along and between the outer and inner edges to enclose the interior space;
   b. an electrical circuit carried by the door within the interior space and connected with an electrical device that is carried on the outer surface of the door; and
   c. a pair of pivotable electrical conductors electrically coupled with the circuit and carried by the door adjacent a side panel thereof, the pivotable conductors being spaced from each othe and being spaced from hinges supporting the door from a door frame, the pivotable conductors including a door-mounted member and a frame-mounted member, and an intermediate member extending between and conductively coupled with each of the door-mounted member and the frame-mounted member to provide a direct conduction path between the respective door-mounted and frame-mounted members.

2. A door as claimed in claim 1, wherein the electrical device includes an electrical outlet receptacle carried by the door and having at least one electrical outlet in the door outer surface to permit the connection with the outlet receptacle of an electrically-powered device that can be carried by the door.

3. A door in accordance with claim 2 wherein the electrical outlet receptacle is positioned to extend through the door outer surface.

4. A door as claimed in claim 1 including an illuminated sign carried by the door, the sign including a panel that is substantially parallel with a door surface and that includes an illumination source positioned within the interior space of the door.

5. A door as claimed in claim 4 wherein the illuminated sign is positioned on the outer surface of the door.

6. A door as claimed in claim 1 wherein the electrical device is a light fixture that is secured to a surface of the door and is electrically connected with the pivotable connector.

7. A door as claimed in claim 6 wherein the light fixture is carried on an outer surface of the door above a door knob and is positioned for providing illumination of the door knob at night.

8. A door as claimed in claim 6 wherein the light fixture is positioned on the interior surface of the door.

9. A door as claimed in claim 8, including an electrical outlet receptacle.

10. A door as claimed in claim 8, including an illuminated sign.

11. A door as claimed in claim 1 wherein the door-mounted member and the frame-mounted member each include an arm, and an electrically conductive connecting member extends between the respective arms in electrical contact therewith.

12. A door as claimed in claim 11 wherein the connecting member includes a first tubular sleeve attached to the door-mounted member and a second tubular sleeve attached to the frame-mounted member, the first and second tubular sleeves disposed in coaxial relationship and having respective opposed ends spaced from each other, and a conductive element positioned between and in electrical contact with the oppose ends of the sleeves.

13. A door as claimed in claim 12 wherein the conductive element is a ball.

14. A door as claimed in claim 13 wherein the opposed ends of the sleeves include spherical recesses.

15. A door as claimed in claim 12 wherein the conductive element is a spring.

16. A door as claimed in claim 15 wherein the spring is a helical compression spring.

17. A door as claimed in claim 16 including friction-reducing bearings positioned at each end of the spring to reduce friction during relative pivotal movement of th connecting members.

* * * * *